US011922530B2

(12) United States Patent
Di Lorenzo et al.

(10) Patent No.: US 11,922,530 B2
(45) Date of Patent: Mar. 5, 2024

(54) SYSTEMS AND METHODS FOR UTILIZING MODELS TO DETERMINE REAL TIME ESTIMATED TIMES OF ARRIVAL FOR SCHEDULED APPOINTMENTS

(71) Applicant: Verizon Connect Development Limited, Dublin (IE)

(72) Inventors: David Di Lorenzo, Florence (IT); Alessio Sanfratello, Florence (IT); Tommaso Bianconcini, Florence (IT)

(73) Assignee: Verizon Connect Development Limited, Dublin (IE)

( * ) Notice: Subject to any disclaimer, the term of this patent is extended or adjusted under 35 U.S.C. 154(b) by 139 days.

(21) Appl. No.: 17/103,171

(22) Filed: Nov. 24, 2020

(65) Prior Publication Data

US 2022/0164913 A1 May 26, 2022

(51) Int. Cl.
*G06Q 50/30* (2012.01)
*G01C 21/36* (2006.01)
(Continued)

(52) U.S. Cl.
CPC ......... *G06Q 50/30* (2013.01); *G01C 21/3691* (2013.01); *G06Q 10/047* (2013.01);
(Continued)

(58) Field of Classification Search
CPC ......... G06Q 10/047; G06Q 10/063114; G06Q 10/063116; G06Q 10/06312;
(Continued)

(56) References Cited

U.S. PATENT DOCUMENTS 9,820,108 B1 * 11/2017 Inciong ............... H04L 67/55
10,119,826 B2    11/2018 Di Lorenzo et al.
(Continued)

FOREIGN PATENT DOCUMENTS

| CN | 112441511 A | * | 3/2021 | ................ B60S 9/10 |
| WO | WO-2010045975 A1 | * | 4/2010 | ............. G01C 21/20 |
| WO | WO-2014087572 A1 | * | 6/2014 | ............ G06T 15/005 |

OTHER PUBLICATIONS

"Appointment Scheduling with Unscheduled arrivals and reprioritization", by Borgman et al., Published with open access at Springerlink. com. Published online: Jan. 20, 2017. (Year: 2017).*
(Continued)

*Primary Examiner* — Pan G Choy

(57) ABSTRACT

A device may receive schedule data identifying schedules of appointments for drivers of vehicles and may receive location data identifying geographical locations of the vehicles. The device may receive traffic data identifying traffic conditions, and may process the received data, with a first model, to determine status data identifying estimated statuses of the appointments. The device may process the received data, with a second model, to generate sets of isochrones for destinations of the appointments, and may calculate, based on the sets of isochrones and the location data, estimated travel time data identifying estimated travel times for the appointments. The device may process the status data, the estimated travel time data, and the schedule data, with a third model, to calculate estimated time of arrival data identifying estimated times of arrival for the appointments, and may perform actions based on the estimated time of arrival data.

20 Claims, 10 Drawing Sheets

(51) Int. Cl.
*G06Q 10/047* (2023.01)
*G06Q 10/0631* (2023.01)
*G06Q 10/083* (2023.01)
*G06Q 10/1093* (2023.01)
*G06Q 30/0204* (2023.01)
*G08G 1/00* (2006.01)

(52) U.S. Cl.
CPC ............... *G06Q 10/063114* (2013.01); *G06Q 10/063116* (2013.01); *G06Q 10/06312* (2013.01); *G06Q 10/083* (2013.01); *G06Q 10/1093* (2013.01); *G06Q 30/0205* (2013.01); *G08G 1/20* (2013.01)

(58) Field of Classification Search
CPC ............ G06Q 10/083; G06Q 10/1093; G06Q 30/0205; G06Q 50/30; G01C 21/3691; G08G 1/20; Y02W 90/00
See application file for complete search history.

(56) References Cited

U.S. PATENT DOCUMENTS

| | | | | |
|---|---|---|---|---|
| 2004/0203904 A1* | 10/2004 | Gwon | ............... | H04W 64/00 455/457 |
| 2013/0225199 A1* | 8/2013 | Shaw | ............... | G06Q 30/0201 455/456.1 |
| 2015/0242819 A1* | 8/2015 | Moses | ............... | G06N 5/04 705/7.19 |
| 2016/0071172 A1* | 3/2016 | Shangguan | ........ | G06Q 30/0284 705/13 |
| 2018/0018635 A1* | 1/2018 | Suzuki | ............... | G06Q 10/1093 |
| 2018/0266834 A1* | 9/2018 | Cronin | ............... | G01C 21/3664 |
| 2019/0267133 A1* | 8/2019 | Schwarz | ............ | G06Q 10/1095 |
| 2019/0342718 A1* | 11/2019 | Pylappan | ....... | G06Q 10/063114 |
| 2020/0210965 A1* | 7/2020 | Garber | ................... | G06Q 10/02 |
| 2020/0356596 A1* | 11/2020 | Lu | ............................ | G06F 16/29 |

OTHER PUBLICATIONS

"Appointment Scheduling Under Patient No-Shows and Service Interruptions", by Luo et al., Department of Statistics and Operations Research, University of North Carolina at Chapel Hill, NC 27599. Manufacturing & Service Operations Management, vol. 14, No. 4, Fall 2012, pp. 670-684. (Year: 2012).*

"Appointment Scheduling in health care: Challenges and opportunities", by Diwakar Gupta, and Brian T. Denton, Graduate Program In Industrial & Systems Engineering, Department of Mechanical Engineering, University of Minnesota. IIE Transactions, Jul. 2008. (Year: 2008).*

"Patient appointment scheduling system: with supervised learning prediction", by Jonathan Strahl, Aalto University, School of Science, Master's Program in Machine Learning and Data Mining. May 27, 2015 (Year: 2015).*

"Appointment Scheduling with unscheduled arrivals and reprioritization", by Borgman et al., Center for Healthcare Operations Improvement and Research (CHOIR), University of Twente, P.O. Box 217, 7500 AE Enschede, The Netherlands. Springerlink.com, Jan. 20, 2017. (Year: 2017).*

Alam et al., "Predicting irregularities in arrival times for transit buses with recurrent neural networks using GPS coordinates and weather data", Springer-Verlag GmbH Germany. Published online: Sep. 3, 2020. Journal of Ambient Intelligence and Humanized computing (2021) 12:7813-7826. (Year: 2020).*

* cited by examiner

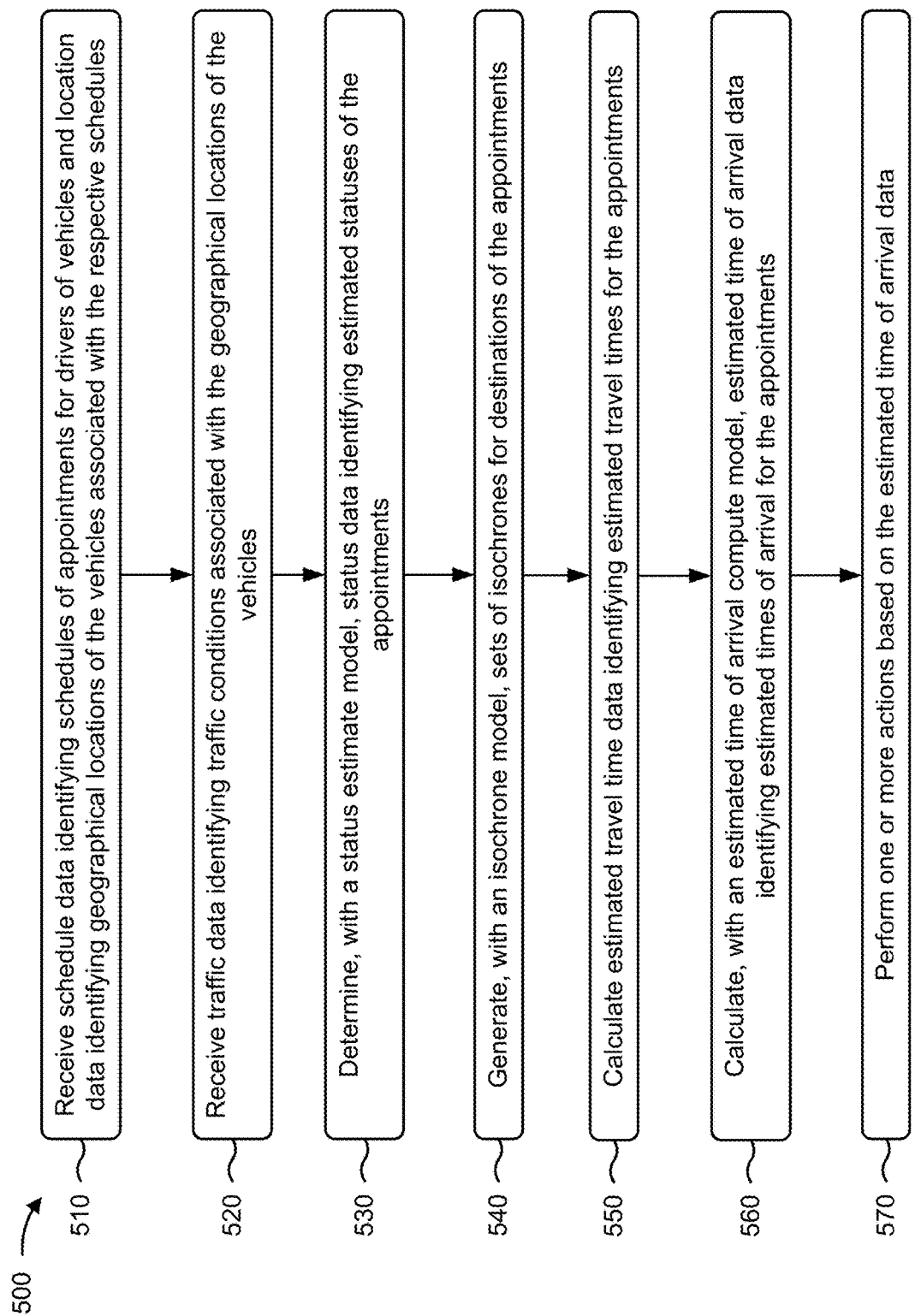

SYSTEMS AND METHODS FOR UTILIZING MODELS TO DETERMINE REAL TIME ESTIMATED TIMES OF ARRIVAL FOR SCHEDULED APPOINTMENTS

BACKGROUND

Many companies or organizations have vehicles in the field. This includes delivery companies, service companies (e.g., cleaning, plumbing, catering, construction, etc.), internal deliveries for large companies, garbage disposal, taxi companies, car sharing companies, and/or the like. Those companies have daily appointments which the drivers must maintain in order to perform their jobs. Appointments can be either static, in which appointment windows or times remain the same during a period (e.g., a day) for deliveries, up to a completely dynamic schedule, in which new appointment requests constantly arrive during the period for deliveries.

BRIEF DESCRIPTION OF THE DRAWINGS

FIG. 5 is a flowchart of an example process for utilizing models to determine real time estimated times of arrival for scheduled appointments.

DETAILED DESCRIPTION OF PREFERRED EMBODIMENTS

Figure 1A:
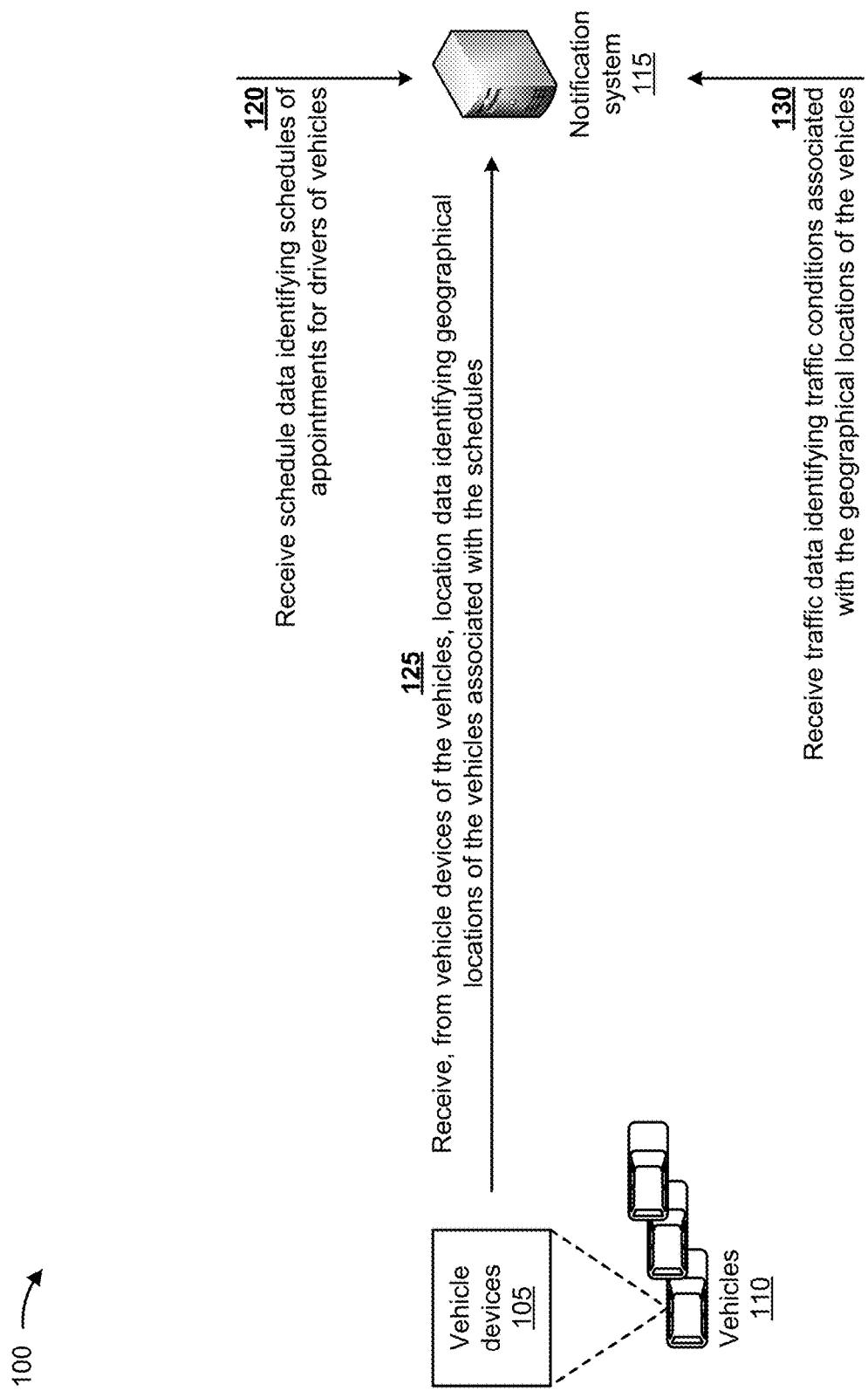
FIGS. 1A-1F are diagrams of one or more example implementations described herein.

The following detailed description of example implementations refers to the accompanying drawings. The same reference numbers in different drawings may identify the same or similar elements.

Many organizations provide products and services for customers that require on-site appointments that require travel. For example, an employee may install equipment, deliver a package, provide a ride to the customer, etc. The organization may provide the customer with a time, or a window of time, when employee is to arrive. As the employee is traveling to the location, the organization may provide the customer with an estimated time of arrival (ETA) for the employee.

In some cases, the ETA may be automatically determined based, at least in part, on a current location of the employee. The employee may utilize a device (e.g., a global positioning device installed in a vehicle or a smart phone of the employee) to obtain location information identifying a current location of the employee. Using the location information and the location of the appointment, an application (e.g., an application executing on the device and/or an application executing on another device) may determine the ETA. The application may cause information identifying the ETA to be provided to an application of a customer device (e.g. a web browser, a smart phone application, etc.). The device may periodically (e.g., every minute) obtain updated location information for the employee. Each time the updated location information is obtained, the updated location information may be provided to the application and the application may determine an updated ETA and provide the updated ETA to the application of the customer device. Determining the updated ETAs and providing the updated ETAs to the application of the customer device may utilize a large amount of computing resources (e.g., processing resources, memory resources, and/or communication resources).

In other cases, the employee may determine the ETA. The employee may determine the ETA based on past experience, personal knowledge of the traffic conditions associated with a time of day of the appointment, and/or an estimate of how long it will take to travel from the employee's current location to the location associated with the appointment. However, this method of determining the ETA is error prone and unreliable because, for example, the employee may not be aware of changing traffic conditions. Furthermore, the employee must manually notify (e.g., call) both the manager and the end customer of the determined ETA, which is tedious, time consuming and, if done while driving, dangerous. Further, the ETAs frequently change over the course of a day due to, for example, changing traffic conditions, customers being late or not showing up at previous appointments, and/or the employee taking longer or shorter than expected to perform the service, thereby making it difficult and/or time consuming for the employee to re-determine the ETAs based on the changing conditions and/or manually notify the manager and the end customer each time an ETA changes.

Implementations described herein provide a notification system that is capable of determining and updating an ETA in real-time using less computing resources. The notification system may utilize models to determine real-time ETAs for scheduled appointments. For example, the notification system may receive schedule data identifying schedules of appointments for drivers, and may receive, from vehicle devices, vehicle location data. The notification system may receive traffic data identifying traffic conditions associated with the geographic locations of the vehicles and/or routes the vehicles are to travel, and may process the schedule data, the vehicle location data, and the traffic data, with a status estimate model, to determine status data identifying estimated statuses of the appointments. The notification system may process the schedule data, the location data, and the traffic data, with an isochrone model, to generate sets of isochrones for destinations of the appointments. A set of isochrones may be a set of polygons encompassing all the points on a map from which a given destination can be reached within a given amount of time (e.g., 5 minutes, 10 minutes, 15 minutes, etc.) via a particular mode of travel (e.g., driving). The notification system may calculate, based on the sets of isochrones and the location data, estimated travel time data identifying estimated travel times for the appointments. For example, the notification system may determine that a location of a driver is within a particular set of isochrones, of the sets of isochrones, based on the location information. The notification system may determine that the sets of isochrones are associated with a particular amount of time that the destination can be reached from points on the map within the set of isochrones. The notification system may determine the ETA based on a time at which the driver is at the location and the particular amount of time.

In this way, the notification system tracks what a driver is doing in the field, based on a live stream of positions generated by a vehicle and/or by the driver's mobile phone without having to recompute the ETA each time updated location information is received. Thus, the notification system may determine and update an ETA in real-time using a reduced amount of computing resources relative to less efficient systems for determining and updating an ETA in real-time.

In some cases, the notification system may receive the driver schedule for the day (and any updates to the driver schedule) and may receive real time changes to the traffic conditions. Optionally, the notification system may receive notifications from the driver about a current status (whether the driver is driving to a particular location of an appointment and/or whether the driver is starting or finishing a particular task associated with an appointment). Using such information for multiple drivers, the notification system may compute the ETA for every appointment and for every driver, considering also new appointments which might arrive during the day and/or changes to existing appointments.

FIGS. 1A-1F are diagrams of an example 100 associated with utilizing models to determine real time estimated times of arrival for scheduled appointments. As shown in FIGS. 1A-1F, example 100 includes vehicle device 105, vehicles 110, and a notification system 115.

A vehicle 110 may include one or more vehicle devices 105 for collecting driving data (e.g., location data indicating a location of the vehicle device 105 and/or the vehicle 110, speed data indicating a speed of the vehicle 110, and/or acceleration data indicating an acceleration of the vehicle 110) as the vehicle 110 travels along a route. For example, the vehicle devices 105 may include an inertial measurement unit (IMU), a three-axis accelerometer, a global positioning system (GPS) device, and/or the like. In some implementations, one or more of the vehicle devices 105 may be included in a mobile device associated with a user (e.g., a driver, a passenger, and/or the like) of the vehicle 110.

The notification system 115 may be co-located with the vehicle devices 105 (e.g., located within the same physical device, on-board the same vehicle, and/or the like) and/or remotely located with respect to the vehicle devices 105. For example, one or more components of the notification system 115 may be on-board vehicle 110, implemented in a network device, and/or located at a central location (e.g., at a facility of an entity utilizing a fleet of vehicles).

Additionally, some implementations described herein may utilize a multi-access edge computing (MEC) environment. In a MEC environment, computing is enabled by a network architecture that provides computing capabilities to a connected device (e.g., vehicle devices such as a smart phone, a GPS, and/or the like) via computing platforms at or near an edge of a network (e.g., a wireless communication network).

Accordingly, because a MEC environment may provide computing at or near the edge of the network, increased performance may be achieved over networks in which computing is performed topologically and/or physically further from a connected device. For example, the MEC environment may offer improved performance due to less traffic and/or congestion between the connected device and the computing node(s), less latency (due to closer proximity to the connected device), increased flexibility (due to a greater amount of computing node(s)), and/or the like.

As shown in FIG. 1A, and by reference number 120, the notification system 115 receives schedule data identifying schedules of appointments for drivers of vehicles 110. A schedule of appointments for a driver of a vehicle 110 may include information identifying the driver (e.g., a name of the driver and/or an employee identifier associated with the driver), information identifying an appointment for the driver (e.g., an identifier associated with the appointment), customer information associated with the appointment (e.g., a name, a telephone number, and/or an address of the customer), a time associated with the appointment, and/or a location associated with the appointment (e.g., the address of the customer and/or a different location), among other types of information associated with a schedule.

The notification system 115 may receive the schedule data periodically (e.g., daily) and/or based on an occurrence of an event (e.g., a new appointment being scheduled, a current appointment being re-scheduled, and/or an appointment being cancelled). In some implementations, the schedule data is input by a user. For example, a customer may utilize an application on a client device associated with the customer (e.g., a computer, a laptop, a tablet, a smart phone, and/or the like) to schedule an appointment. The customer may input one or more portions of the schedule data to schedule the appointment.

In some implementations, the notification system 115 receives the schedule data from another device. For example, the notification system 115 may obtain the schedule data from a user device associated with the driver. The driver may input schedule data into an application running on the user device. The application may provide the schedule data to the notification system 115 based on the user inputting the schedule data, periodically, and/or based on receiving a request from the notification system 115.

As shown by reference number 125, the notification system 115 receives, from vehicle devices 105 of vehicles 110 location data identifying geographical locations of the vehicles 110 associated with the schedules. The vehicle devices 105 may provide the location data to the notification system 115. In some implementations, the vehicle devices 105 provide the location data to the notification system 115 via another device. For example, a vehicle device 105 may provide the location data to a server device associated with the notification system 115. The server device may receive the location data and may store the location data in a data structure (e.g., a data base, a list, a table, and/or the like). The server device may provide the stored location data to the notification system 115 (e.g., in response to a request from the notification system 115 and/or periodically).

In some implementations, the vehicle device 105 provides the location data to the notification system 115 and/or the server device in real-time and/or as the vehicle 110 travels along a route to a location associated with an appointment. Alternatively, and/or additionally, the vehicle device 105 provides the location data to the notification system 115 and/or the server device based on an occurrence of an event such as receiving an input from a user, the vehicle 110 reaching a destination (e.g., the location associated with the appointment), a current time of day being within a particular amount of time (e.g., thirty minutes, one hour, two hours, and/or the like) prior to a time of an appointment, the vehicle 110 being parked, the vehicle 110 being stopped for an amount of time, and/or the vehicle 110 leaving a particular destination (e.g., the location associated with the appointment). The above-listed events are intended to be merely examples of types of events that may be used. In practice, the events may include any one or more of the above-listed events and/or one or more other types of events not listed above.

As shown by reference number 130, the notification system 115 receives traffic data identifying traffic conditions associated with the geographic locations of the vehicles 110. The notification system 115 may determine a geographic location of a vehicle 110 based on the location data. The location data may include information identifying the vehicle 110. The notification system 115 may determine a driver associated with the vehicle 110. For example, the notification system 115 may determine the driver associated with the vehicle 110 based on information stored in a data structure that maps vehicles 110 to drivers. The notification system 115 may determine a set of locations of a set of appointments associated with the driver based on the schedule data. The notification system 115 may a geographic area associated with the location of the vehicle 110 and the set of locations. The notification system 115 may obtain traffic data identifying traffic conditions associated with the location of the vehicle 110 and the set of locations. For example, the notification system 115 may request the traffic data from a server device associated with a service provider that provides current traffic data. The notification system 115 may receive the traffic data based on the request.

Figure 1B:
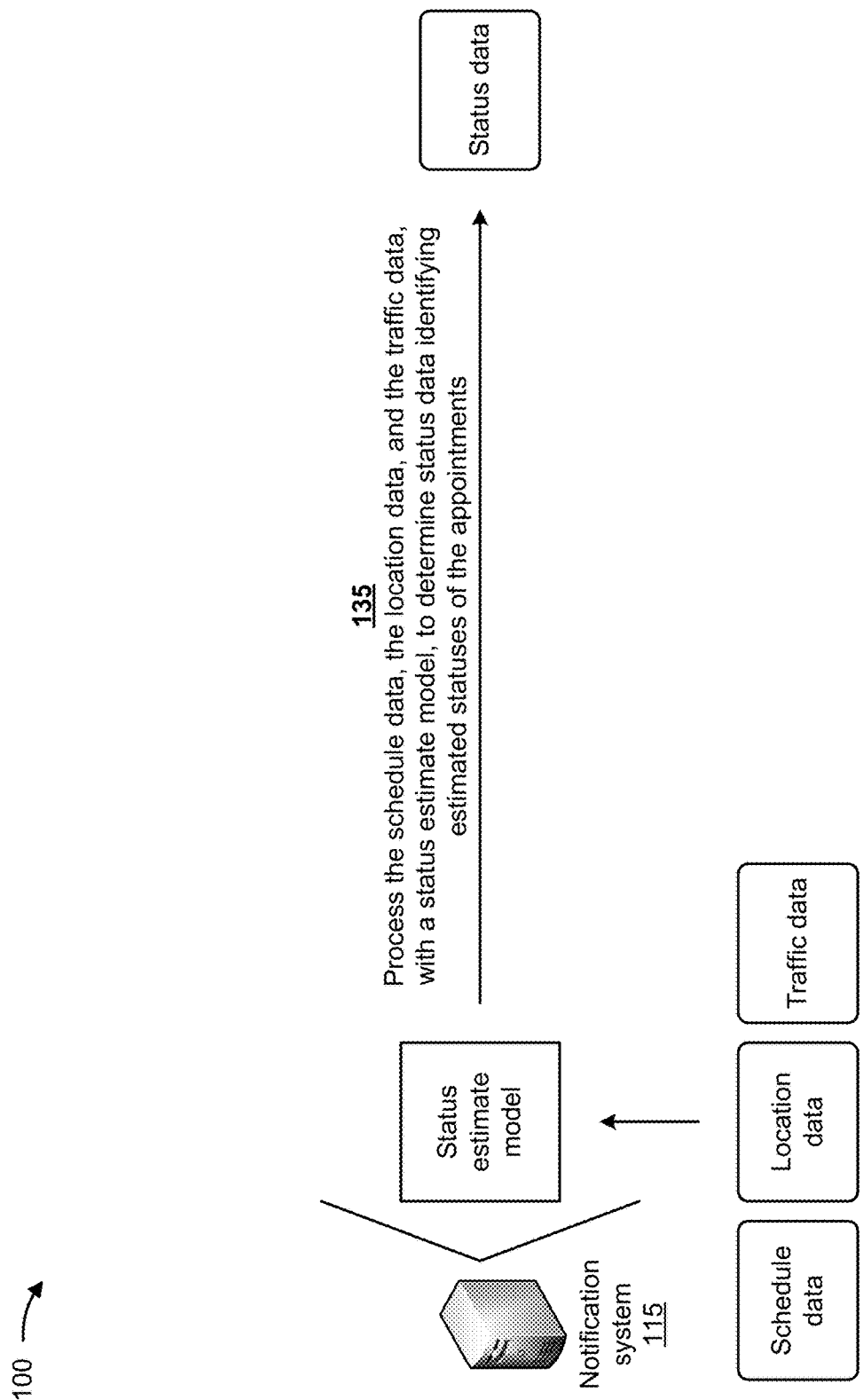

As shown in FIG. 1B, and by reference number 135, the notification system 115 processes the schedule data, the location data, and the traffic data, with a status estimate model, to determine status data identifying estimated statuses of the appointments. The status of an appointment may be not started, started, completed, reaching location, paused, and/or cancelled, among other examples. The not started status may indicate that a driver has not started to perform a task associated with the appointment. For example, an appointment may be associated with the not started status based on a current time of day being prior to a time of the appointment, the driver not reaching a location associated with the appointment, and/or the driver having reached the location associated with the appointment but not having started a task associated with the appointment.

The started status may indicate that the driver has begun performing a task associated with an appointment. For example, an appointment may be associated with the started status based on the driver having arrived at a location associated with the appointment, a vehicle 110 associated with the driver being located within a particular distance of the location associated with the appointment, and/or the driver having started performing the task associated with the appointment.

The reaching location status may indicate that a vehicle 110 associated with a driver is traveling to a location associated with an appointment and/or is within a particular distance (e.g., 500 feet, 0.5 miles, 1.0 miles, and/or the like) of the location associated with the appointment. For example, an appointment may be associated with the reaching location status based on the driver driving to a location associated with the appointment, the driver being within a particular distance of the location associated with the appointment, and/or the driver not having arrived at the location associated with the appointment.

The paused status may indicate that the driver has started performing a task associated with an appointment, that the driver has not completed the task, and that the driver is currently not performing the task (e.g., the driver is taking a lunch break). The cancelled status may indicate that an appointment has been cancelled.

In some implementations, the driver may input information identifying the status of an appointment via the vehicle device 105 and/or an application executing on a mobile device associated with the driver. For example, the driver may input information associating an appointment with the reaching location status into the vehicle device 105 and/or the mobile device associated with the driver when the driver is traveling to a location associated with the appointment and/or is within a particular distance of the location associated with the appointment. The vehicle device 105 and/or the mobile device associated with the driver may provide the information associating the appointment with the reaching location status to the notification system 115. The notification system 115 may determine the status of the appointment based on the received information.

In some implementations, the notification system 115 determines the status of each appointment included in a schedule of appointments associated with a driver. The notification system 115 may obtain schedule data associated with a driver of a vehicle 110. The schedule data may include information identifying an appointment, a time of the appointment, and/or a location associated with the appointment (e.g., a location at which a task is to be performed by the driver). The notification system 115 may obtain location data associated with the vehicle 110 based on the time of the appointment. The notification system 115 may obtain location data identifying a location of the vehicle 110 during a first period of time occurring prior to the time of the appointment and a second period of time immediately following the time of the appointment.

As an example, assume the time of the appointment is 10:00 am. The notification system 115 may obtain location data identifying a location of the vehicle 110 during a one hour period of time prior to the time of the appointment (e.g., from 9:00 am-10:00 am) and during a one hour period of time following the time of the appointment (e.g., from 10:00 am-11:00 am).

In some implementations, a length of the first period of time (e.g., thirty minutes, one hour, two hours, and/or the like) is the same as a length of the second period of time. In some implementations, the length of the first period of time is different from the length of the second period of time.

In some implementations, the length of the first period of time and/or the second period of time is determined based on information associated with the driver (e.g., a time at which the driver's work day begins, a time at which the driver's work day ends, a time at which the driver takes a lunch break, and/or other information associated with the driver), the time of the appointment (e.g., whether the appointment is the first appointment scheduled for the day and/or whether the appointment is the last appointment scheduled for the day), and/or the location of the appointment (e.g., a distance between the location of the appointment and a location of an earlier scheduled appointment and/or a distance between the location of the appointment and a current location of the vehicle 110). As an example, the schedule data associated with the driver may include information identifying a time at which the driver starts working. The notification system 115 may determine the first period of time based on an amount of time between the time the driver starts working and the time of the first appointment.

Alternatively, and/or additionally, the schedule data may include information identifying the length of the first period of time and/or the length of the second period of time. The notification system 115 may determine the determine the first period of time and/or the second period of time based on the information identifying the length of the first period of time and/or the second period of time and the time of the appointment.

The notification system 115 may determine whether the vehicle 110 stopped near the location of the appointment based on the location data. A location of the vehicle 110 may be near the location of the appointment when the location of the vehicle 110 is within a predetermined distance (500 feet, one kilometer, and/or the like) of the location of the appointment. The notification system 115 may determine the predetermined distance based on the driver, the location of the appointment, and/or another factor.

In some implementations, the location data includes a time-ordered series of data points. The notification system 115 may determine whether the time-ordered series of data points includes a set of consecutive data points corresponding to the same location. The notification system 115 may determine whether the location is near the location of the appointment. The notification system 115 may determine that the vehicle stopped near the location of the appointment when the time-ordered series of data points includes the set of consecutive data points corresponding to the same location and the location is near the location of the location of the appointment.

In some implementations, the notification system 115 determines that the vehicle 110 did not stop near the location of the appointment. For example, the notification system 115 may determine that the time-ordered series of data points does not include the set of consecutive data points corresponding to the same location and/or that the location is not near the location of the appointment. The notification system 115 may determine that the status of the appointment is a first status (e.g., the not started status) based on the vehicle 110 not stopping near the location of the appointment.

In some implementations, the notification system 115 determines that the vehicle 110 stopped near the location of the appointment. For example, the notification system 115 may determine that the time-ordered series of data points includes the set of consecutive data points corresponding to the same location and that the location is near the location of the location of the appointment. The notification system 115 may determine whether the vehicle 110 has been at the location for at least a minimum amount of time (e.g., five minutes, ten minutes, thirty minutes, and/or the like) based on the location data. As an example, the notification system 115 may determine a first time associated with a first data point, of the set of consecutive data points, and a second time associated with a last data point, of the set of consecutive data points. The notification system 115 may determine an amount of time between the first data point and the last data point based on the first time and the second time. The notification system 115 may determine whether the amount of time between the first data point and the second data point satisfies a time threshold. The notification system 115 may determine that the vehicle 110 has been at the location for at least a minimum amount of time when the amount of time between the first data point and the second data point satisfies the time threshold.

In some implementations, the notification system 115 determines that the vehicle 110 has not been at the location for at least the minimum amount of time. The notification system 115 may determine that the status of the appointment is a second status (e.g., not started, reaching location, and/or started) based on the vehicle 110 not having been at the location for at least the minimum amount of time.

In some implementations, the notification system 115 determines that the vehicle 110 has been at the location for at least the minimum amount of time. The notification system 115 may determine whether the vehicle 110 is still at the location based on the vehicle 110 having been at the location for at least the minimum amount of time. The notification system 115 may determine whether the vehicle 110 is still at the location based on the location data associated with the second period of time and/or a current location of the vehicle 110.

The notification system 115 may determine whether a time associated with the last data point, of the set of consecutive data points, is prior to an end of the second period of time. In some implementations, the notification system 115 determines that the time associated with the last data point is prior to the end of the second period of time. The notification system 115 may determine that the vehicle 110 has left the location based on the time associated with the last data point being prior to the end of the second period of time.

In some implementations, the notification system 115 determines that the time associated with the last data point corresponds to (e.g., is not prior to) the end of the second period of time. The notification system 115 may determine a current location of the vehicle 110 based on the location data. The notification system 115 may determine whether the current location of the vehicle 110 is the same as the location near the location of the appointment. The notification system 115 may determine that the vehicle 110 is still at the location near the location of the appointment when the current location of the vehicle 110 is the same as the location near the location of the appointment.

In some implementations, the notification system 115 determines that the vehicle 110 is still at the location near the location of the appointment. The notification system 115 may determine that the status of the appointment is a third status (e.g., started) based on the vehicle 110 still being at the location near the location of the appointment.

In some implementations, the notification system 115 determines that the vehicle 110 has left the location near the location of the appointment. The notification system 115 may determine that the status of the appointment is a fourth status (e.g., completed) based on the vehicle 110 having left the location near the location of the appointment.

Alternatively, and/or additionally, the notification system 115 may determine the status of the appointment based on information input by the driver. The driver may input information indicating the status of the appointment via the vehicle device 105 and/or a user device associated with the driver. The vehicle device 105 and/or the user device may provide the information to the notification system 115. The notification system 115 may determine the status of the appointment based on the information received from the vehicle device 105 and/or the user device. The notification system 115 may store information identifying the status of the appointment and/or information identifying a time at which the status was determined in the schedule of appointments associated with the driver.

In some implementations, the notification system 115 provides information identifying the status of the appointment to one or more other devices. For example, the notification system 115 may provide information identifying the status of the appointment to the vehicle device 105 of the vehicle 110, a user device associated with the driver, a user device associated with a customer associated with the appointment, and/or a user device associated with a manager or supervisor of the driver.

The notification system 115 may determine a respective status of each appointment of the schedules of appointments identifies in the schedule data and/or provide information identifying the respective statuses, in a manner similar to that described above.

Figure 1C:
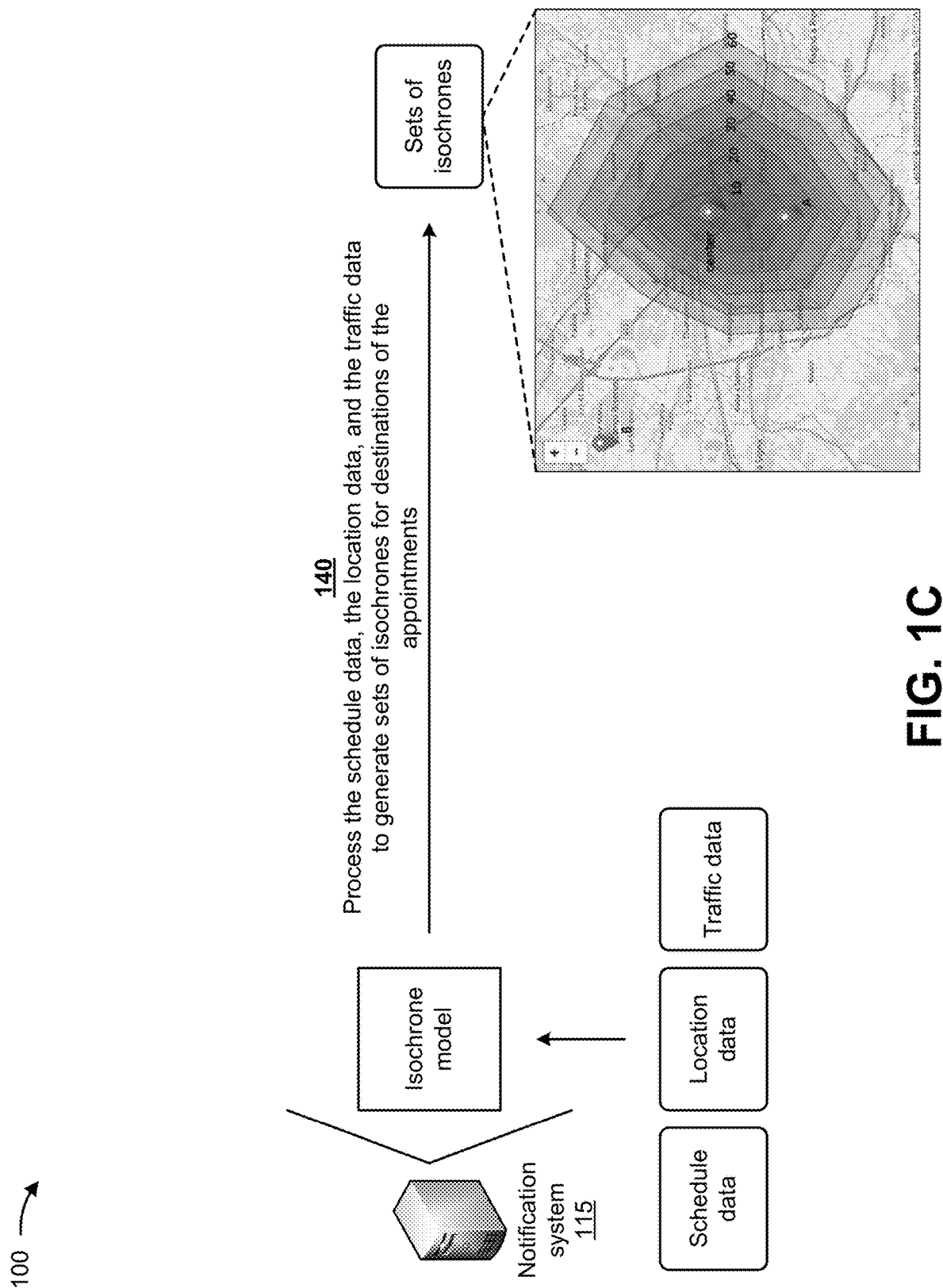

As shown in FIG. 1C, and by reference number 140, the notification system 115 processes the schedule data, the location data, and the traffic data to generate sets of isochrones for destinations of the appointments for example. An isochrone may be a polygon encompassing all the points on a map from which a destination can be reached via a particular mode of travel within an amount of time. As an example, a 30-minute isochrone for a particular destination may be the polygon delimiting a map region from which the particular destination can be reached within thirty minutes of driving time. The particular destination may represent a center of the isochrone. The number of vertices in the polygon may be based on a quantity of roadways included in the map region from which the particular destination can be reached within the amount of time. For example, the vertices may correspond to a group of nodes used to determine the map region from which the particular destination can be reached within the amount of time, as described below. Here, the isochrones efficiently allow updating of the ETA to a next appointment for the vehicle 110 with a cost that is significantly less than standard algorithms for determining distance from one point to another point.

The notification system 115 may utilize an algorithm for computing travel times to compute the sets of isochrones. For example, the notification system 115 may utilize a Dijkstra algorithm to compute the set of isochrones. The notification system 115 may generate a graph representing a map of a region including the location of an appointment. The graph may include a plurality of nodes connected via a plurality of edges. A node, of the plurality of nodes, may represent an intersection of two or more roads, an end of a road, and/or a particular location (e.g., the location of the appointment). An edge, of the plurality of edges, may be connected to two nodes, of the plurality of nodes, and may represent a road associated with the node. The edge may be associated with a weight. The weight may be determined based on an amount of time required to travel between locations represented by the two nodes and/or a distance between the locations. The notification system 115 may utilize the algorithm to determine a path (e.g., a shortest path based on travel time) from the node representing the location of the appointment to each of the other nodes. The notification system 115 may associate each of the other nodes with information identifying the amount of time required to travel between the node and the node representing the location of the appointment (e.g., the travel time) based on the determined paths.

The notification system 115 may determine an amount of time associated with a first isochrone (e.g., five minutes). The notification system 115 may identify a set of first nodes associated with a travel time that is less than or equal to the amount of time associated with the first isochrone.

The notification system 115 may generate a polygon encompassing the locations represented by the first set of nodes. In some implementations, the notification system 115 determines a set of polygons defined by the edges connecting the nodes included in the first set of nodes. The notification system 115 may merge the polygons included in the set of polygons to generate the polygon representing the first isochrone.

In some implementations, the notification system 115 generates the polygon based on a grid representation of the map region represented by the graph. The notification system 115 may divide the map region into a plurality of rectangles to form a grid. The notification system 115 may identify a first set of rectangles that include locations represented by at least one node included in the first set of nodes and/or at least one edge connected to a node included in the first set of nodes. The notification system 115 may identify a second set of rectangles that are completely surrounded by rectangles included in the first set of rectangles. The notification system 115 may generate the polygon representing the first isochrone based a contour of a shape formed by the first and second sets of rectangles.

The notification system 115 may determine an amount of time associated with a second isochrone (e.g., ten minutes). The notification system 115 may generate a polygon representing the second isochrone in a manner similar to that described above. The polygon representing the second isochrone may be centered on the location of the appointment and may encompass the polygon representing the first isochrone. The notification system 115 may continue generating isochrones in a similar manner until an amount time associated with an isochrone satisfies a time threshold (e.g., thirty minutes, one hour, two hours, and/or the like).

In some implementations, the notification system 115 obtains information identifying the sets of isochrones from another device. For example, the notification system 115 may generate sets of isochrones for a plurality of map regions in a manner similar to that described above. The notification system 115 may store information identifying the generated sets of isochrones in a server device associated with the notification system 115.

In some implementations, the notification system 115 generates information identifying an isochrone, of the generated sets of isochrones, based on an approximation of a shape of a polygon representing the isochrone. The notification system 115 may generate a set of grid points based on a map region associated with the isochrone. The notification system 115 may construct the grid based on a reference point (e.g., a randomly selected location, a northernmost location, a westernmost location, and/or the like) included in the map region. The notification system 115 may determine that the reference point corresponds to a first grid point of the grid. The notification system 115 may determine a latitude and a longitude associated with the reference point. The notification system 115 may determine a plurality of other points of the map region by adding and/or subtracting multiples of a first value from the latitude associated with the reference point and/or by adding and/or subtracting multiples of a second value from the longitude associated with the reference point. The first value may be the same as, or different from, the second value. The first value and the second value may be determined to cause every grid point in the set of grid points to be equally spaced from an adjacent grid point by a fixed value (e.g., fifty meters, one kilometer, and/or the like). The fixed value may correspond to a precision associated with the isochrone.

As an example, a reference point may be a first grid point and may associated with a latitude of zero and a longitude of zero. The notification system 115 may determine that the first value is fifty and that the second value is fifty. The notification system 115 may add the first value to the latitude associated with the reference point (e.g., 0+50=50). The notification system 115 may determine a second grid point corresponding to a point in the map region associated with a latitude of fifty and a longitude of zero. The notification system 115 may add a multiple (e.g., 2) of the first value to the latitude associated with the reference point (e.g., 0+(2× 50)=100). The notification system 115 may determine a third grid point corresponding to a point in the map region associated with a latitude of one hundred and a longitude of zero.

The notification system 115 may snap every vertex of the polygon to a closest grid point of the set of grid points. The notification system 115 may convert the latitude and longitude associated with a grid point to which a vertex was snapped into a pair of integer values corresponding to a Cartesian position of the grid point on the grid relative to the reference point.

As an example, the notification system 115 may determine the pair of integer values (0,0) for the first grid point based on the first grid point corresponding to the reference point. The notification system 115 may determine a multiple of the first value added to the latitude associated with the second grid point (e.g., 1) and a multiple of the second value added to the longitude associated with the second grid point (e.g., 0). The notification system 115 may determine an integer pair (1, 0) for the second grid point based on the multiple of the first value added to the latitude associated with the second grid point and the multiple of the second value added to the longitude associated with the second grid point.

In some implementations, the notification system 115 pre-computes the sets of isochrones and stores the pre-computed sets of isochrones. The notification system 115 may determine a quantity of bits to be used to store the integer pairs. The notification system 115 may determine to encode the integer pairs to reduce a size of the information stored for the isochrone. For example, the notification system 115 may determine to utilize two's complement encoding to encode the integer pairs. The notification system 115 may determine a first quantity of bits required to encode all the segments of the polygon representing the isochrone. For example, the notification system 115 may determine a largest quantity of bits required to represent an encoded integer pair. The notification system 115 may determine a size of the encoded data.

The notification system 115 may determine a second quantity of bits by reducing the first quantity by one. The notification system 115 may encode the integer pairs based on the second quantity of bits. The notification system 115 may determine that an integer, of an integer pair, is too large to be represented by the second quantity of bits. The notification system 115 may identify a grid point associated with the integer. The notification system 115 may identify a segment of the polygon associated with the grid point (e.g., a segment of the polygon that crosses through the grid point).

The notification system 115 may split the segment of the polygon into two or more portions. For example, the notification system 115 may identify a center point of the segment. The notification system 115 may identify a grid point that is closest to the center point relative to the other grid points of the grid. The notification system 115 may substitute the segment with a first partial segment extending from the center point to one end of the segment and a second partial segment extending from the center point to the other end of the segment. The notification system 115 may determine integer pairs for the grid points corresponding to the ends of the first and second partial segments in a manner similar to that described above. The notification system 115 may encode the integer pairs based on the second quantity of bits. The notification system 115 may split each segment of the polygon associated with an integer that is too large to be represented by the second quantity of bits.

The notification system 115 may determine whether a size of the data encoded based on the second quantity of bits is less than a size of the data encoded based on the first quantity of bits. In some implementations, the size of the data encoded based on the first quantity of bits is less than the size of the data encoded based on the size of the data encoded based on the second quantity of bits. The notification system 115 may utilize the data encoded based on the first quantity of bits based the size of the data encoded based on the first quantity of bits being less than the size of the data encoded based on the second quantity of bits.

In some implementations, the size of the data encoded based on the second quantity of bits is less than the size of the data encoded based on the first quantity of bits. The notification system 115 may determine a third quantity of bits by reducing the second quantity of bits by one. The notification system 115 may encode the data based on the third quantity of bits in a manner similar to that described above. The notification system 115 may continue in a similar manner until the size of the data encoded with a particular quantity of bits is greater than a size of the data encoded with a previous quantity of bits.

The notification system 115 may store the isochrone by storing information identifying the amount of time associated with the isochrone, the latitude and the longitude associated with the first grid (e.g., the reference point), the integer pair determined for each grid point to which a vertex of the polygon representing the isochrone was snapped in a data structure stored in a memory of the server device, and a quantity of bits to be used to represent the integer pairs. By storing the data encoded based on the quantity of bits, determined in the manner described above, the notification system 115 may minimize computing resources (e.g., memory resources) required to store the sets of isochrones.

Figure 1D:
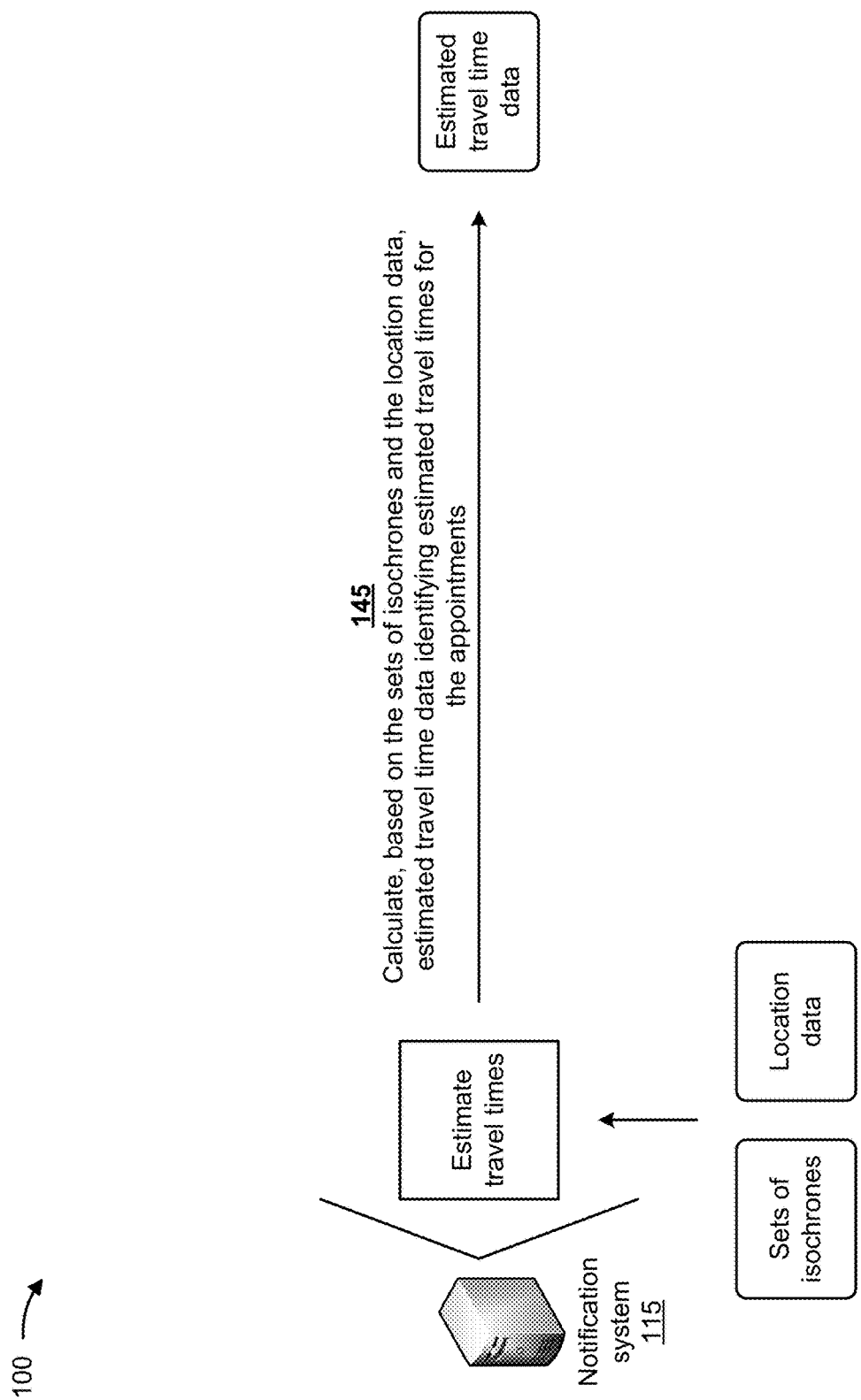

As shown in FIG. 1D, and by reference number 145, the notification system 115 calculates, based on the sets of isochrones and the location data, estimated travel time data identifying estimated travel times for the appointments. The notification system 115 may determine a current location of a vehicle 110 based on the location data. The notification system 115 may determine a location of an appointment based on the schedule data. The notification system 115 may determine a map region, of the plurality of map regions, that includes the location of the appointment and/or the current location of the vehicle 110. The notification system 115 may obtain the sets of isochrones associated with the map region from the server device based on the map region included in the location of the appointment and/or the current location of the vehicle 110.

The notification system 115 may identify a smallest isochrone (e.g., the isochrone associated with the smallest amount of time relative to the amounts of time associated with the other isochrones) that includes the current location of the vehicle 110. The notification system 115 may identify a largest isochrone (e.g., the isochrone associated with the largest amount of time relative to the amounts of time associated with the other isochrones) that does not include the current location of the vehicle 110. The notification system 115 may determine a first amount of time associated with the smallest isochrone and a second amount of time associated with the largest isochrone. The notification system 115 may estimate a travel time associated with the vehicle 110 traveling from the current location of the vehicle 110 to the location of the appointment based on the first amount of time and the second amount of time.

In some implementations, the estimated travel time corresponds to the first amount of time. In some implementations, the estimated travel time corresponds to the second amount of time. In some implementations, the estimated travel time corresponds to an average of the first amount of time and the second amount of time. In some implementations, the estimated travel time is based on ratio of a distance between the current location of the vehicle 110 and an edge of the smallest isochrone (or a distance between the current location of the vehicle 110 and an edge of the largest isochrone) and a distance between the edge of the smallest isochrone and the edge of the largest isochrone.

In some implementations, the notification system 115 may adjust the estimated travel time based on traffic conditions associated with driving to the location of the appointment. As an example, driver may utilize the vehicle device 105 to determine a route to the location of the appointment. The vehicle device 105 may determine the route and may provide information identifying the route to the driver (e.g., via a display of the vehicle device 105) and/or the notification system 115. The notification system 115 may determine traffic conditions associated with the route based on the traffic data. The notification system 115 may modify the estimated travel time based on the traffic conditions. For example, the notification system 115 may increase the estimated travel time based on the traffic data indicating congestion along the route, an occurrence of an accident along the route, and/or the like.

Figure 1E:
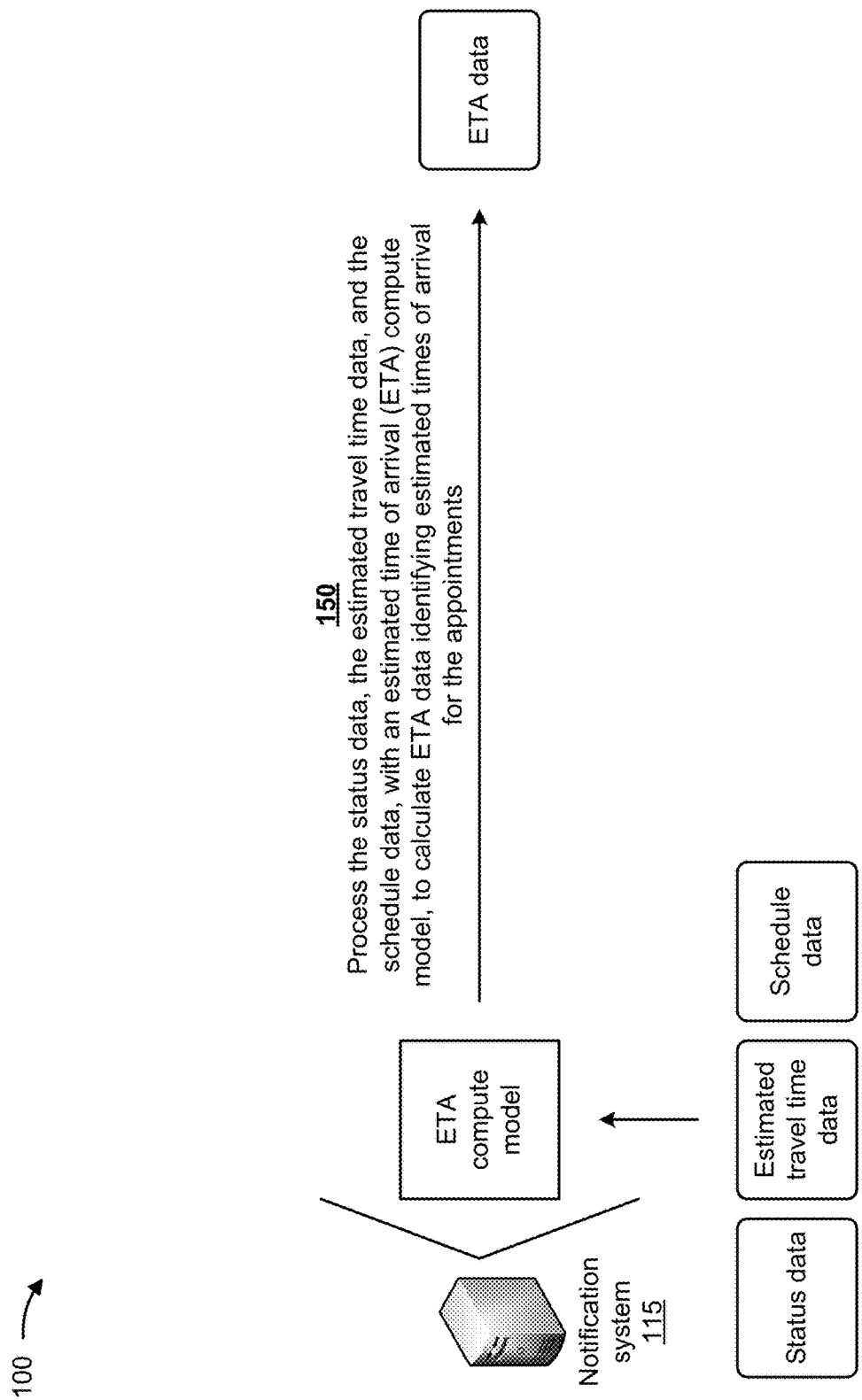

As shown in FIG. 1E, and by reference number 150, the notification system 115 processes the status data, the estimated travel time data, and the schedule data, with an ETA compute model, to calculate ETA data identifying estimated times of arrival for the appointments. The notification system 115 may determine a schedule of appointments associated with a driver and/or a vehicle 110. The schedule of appointments may include a list of appointments associated with the driver. The notification system 115 may identify a status associated with each appointment. The notification system 115 may identify an appointment associated with a status indicating that a task to be performed by the driver during the appointment has not been completed and/or that the appointment has not been cancelled. For example, the notification system 115 may identify an appointment having a status of not started, reaching location, started, and/or paused.

The notification system 115 may determine that a time of the identified appointment is prior to a time associated with other appointments associated with a status indicating that a task to be performed by the driver during the appointment has not been completed and/or that the appointment has not been cancelled. The notification system 115 may determine that the appointment is a current appointment associated with the driver based on the time of the appointment being prior to a time associated with the other appointments associated with the status indicating that a task to be performed by the driver during the appointment has not been completed and/or that the appointment has not been cancelled.

The notification system 115 may determine whether the driver is currently performing a task associated with current appointment or is driving to the current appointment based on the status of the current appointment. In some implementations, the notification system 115 determines that the driving is driving to the current appointment. For example, the notification system 115 may determine that the driver is driving to the current appointment when the current appointment is associated with the status not started and/or reaching location. The notification system 115 may determine an ETA associated with the current appointment based on the travel time calculated based on the sets of isochrones, as described above.

In some implementations, the notification system 115 determines that the driver is currently performing the task associated with the current appointment. For example, the notification system 115 may determine that the driver is currently performing the task associated with the current appointment when the current appointment is associated with the status started and/or paused. The notification system 115 may determine an ETA associated with a next appointment based on the driver currently performing the task associated with the current appointment. The next appointment may be an appointment associated with a time that is later than a time of the current appointment and is earlier than a time associated with other appointments included in the schedule of appointments associated with the driver.

The notification system 115 may determine the ETA associated with the next appointment based on an estimate of an amount of time associated with the driver completing the task associated with the current appointment and a travel time associated with the driver driving from a location of the current appointment to a location of the next appointment.

The notification system 115 may determine a start time associated with the current appointment. The start time may be a time at which the status of the current appointment was set to started. The notification system 115 may determine the start time based on the information identifying the time at which the start status was determined stored in the schedule of appointments associated with the driver. The notification system 115 may subtract the start time from a current time to determine an amount of time the driver has been performing the task.

In some implementations, the notification system 115 determines that the status of the current appointment was set to paused for a period of time. The notification system 115 may subtract the period of time from the amount of time to determine the amount of time the driver has been performing the task.

The notification system 115 may determine a duration of time associated with the current appointment. In some implementations, the notification system 115 determines the duration of time based on an end time associated with the current appointment. For example, the schedule of appointments may include information indicating a time at which the current appointment is to end. In some implementations, the notification system 115 determines the duration of time based on the task being performed by the driver. The schedule of appointments may include information identifying the task being performed by the driver. The notification system 115 may determine an amount of time associated with performing the task based on information stored in a data structure mapping tasks to amounts of time associated with performing the tasks. The notification system 115 may estimate the amount of time required for the driver to complete the task associated with the current appointment based on subtracting the amount of time the driver has been performing the task from the amount of time associated with performing the task.

The notification system 115 may determine the travel time associated with the driver driving from the location of the current appointment to the location of the next appointment based on the sets of isochrones and/or traffic conditions associated with traveling to the location of the next appointment, in a manner similar to that described above. The notification system 115 may determine the ETA for the next appointment based on the amount of time required for the driver to complete the task and the estimated travel time. For example, the notification system 115 may add the amount of time required for driver to complete the task and the estimated travel time to a current time to determine the ETA for the next appointment.

Figure 1F:
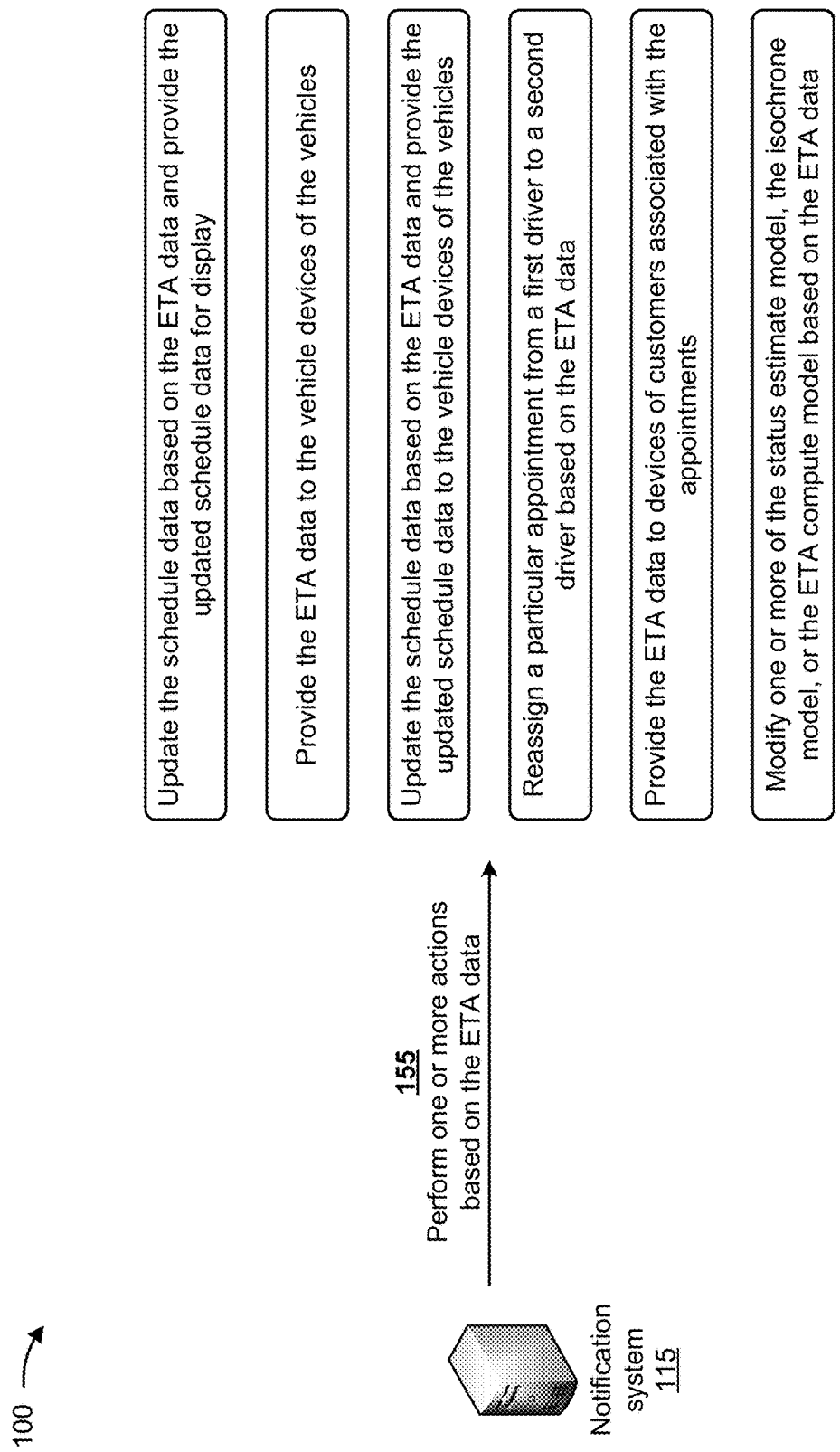

As shown in FIG. 1F, and by reference number 155, the notification system 115 performs one or more actions based on the ETA data. In some implementations, the one or more actions include updating the schedule data based on the ETA data and providing the updated schedule data for display. For example, the notification system 115 may determine that the ETA is later than a time of the appointment. The notification system 115 may provide a notification to a user device associated with a customer associated with the next appointment. The notification may include information indicating the ETA and/or information inquiring whether the customer would like to reschedule the appointment.

In some implementations, the customer may provide a response to the notification indicating that the customer would like to reschedule the appointment and/or information indicating a time and/or a date associated with the rescheduled appointment. The notification system 115 may update the schedule of appointments associated with the driver based on the information included in the response. The notification system 115 may provide the updated schedule data to the vehicle device 105, a user device associated with the driver, a user device associated with the customer, and/or a user device associated with a manager of the driver to cause the user devices to display the updated schedule of appointments for display.

In some implementations, the one or more actions include reassigning a particular appointment from a first driver to a second driver based on the ETA data. For example, the response to the notification may indicate that the customer does not want to reschedule the appointment. The notification system 115 may reassign the next appointment to another driver based on ETA being later than the time of the next appointment and based on the customer not wanting to reschedule the appointment. The notification system 115 may provide information associated with rescheduling the appointment to the vehicle device 105 associated with the driver, the vehicle device 105 associated with the other driver, and/or the user device of the customer.

In some implementations, the one or more actions include providing the ETA data to the vehicle devices 105 of the vehicles 110. For example, the notification system 115 may provide the ETA data to the vehicle device 105 of the vehicle 110 associated with the driver. In this way, the notification system 115 may provide the driver with current ETA data as the driver travels to a location of an appointment.

In some implementations, the one or more actions include modifying one or more of the status estimate model, the isochrone model, or the ETA compute model based on the ETA data. The notification system 115 may determine a time that the driver arrived at the location of the next appointment based on the location data. The notification system 115 may compare the time that the driver arrived at the location of the next appointment and the ETA to determine an accuracy associated with the ETA. The notification system 115 may utilize the time that the driver arrived at the location of the next appointment and the ETA to modify one or more of the status estimate model, the isochrone model, or the ETA compute model. In this way, the notification system 115 may increase an accuracy of the status estimate model, the isochrone model, or the ETA compute model.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
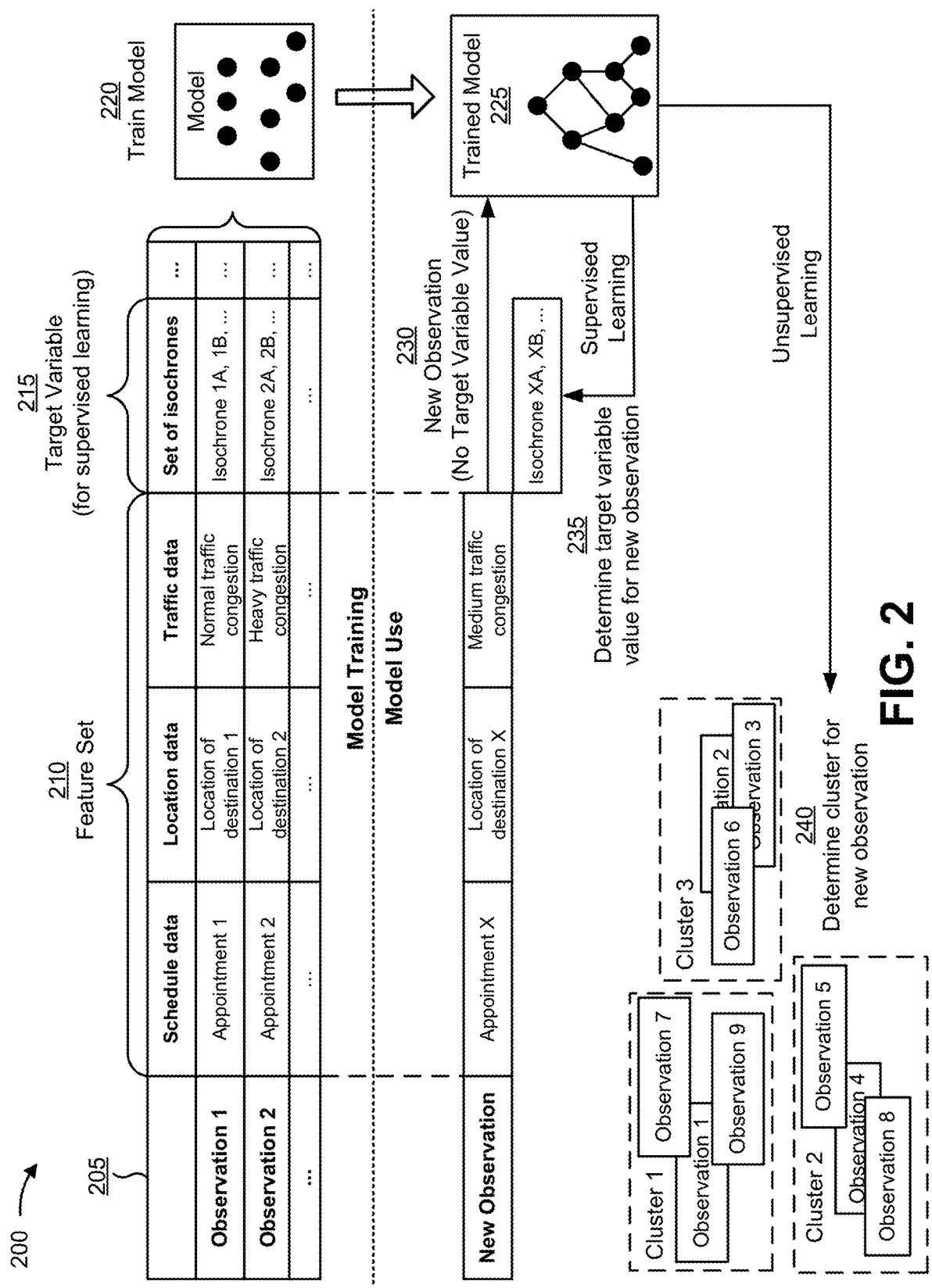
FIG. 2 is a diagram illustrating an example of training a machine learning model and applying a trained machine learning model to a new observation.

FIG. 2 is a diagram illustrating an example 200 of training and using a machine learning model in connection with determining real time estimated times of arrival for scheduled appointments. The machine learning model training and usage described herein may be performed using a machine learning system. The machine learning system may include or may be included in a computing device, a server, a cloud computing environment, and/or the like, such as notification system 115, described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from vehicle devices 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from vehicle devices 105. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of schedule data, a second feature of location data, a third feature of traffic data, and so on. As shown, for a first observation, the first feature may have a value of appointment 1, the second feature may have a value of location of destination 1, the third feature may have a value of normal traffic congestion, and so on. These features and feature values are provided as examples and may differ in other examples. For example, the feature set may include one or more of the following features: schedule data, location data, traffic data, and/or the like.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is a set of isochrones, which has a value of isochrone 1A, 1B, etc. for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of appointment X, a second feature of a location of destination X, a third feature of medium traffic congestion, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of isochrone XA, XB, etc. for the target variable of the set of isochrones for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a first travel time. The first automated action may include, for example, a first ETA.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a first set of isochrones), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a second set of isochrones), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine real time estimated times of arrival for scheduled appointments. The machine learning system enables recognition and/or identification of tens, hundreds, thousands, or millions of features and/or feature values for tens, hundreds, thousands, or millions of observations, thereby increasing accuracy and consistency and reducing delay associated with determining real time estimated times of arrival for scheduled appointments relative to requiring computing resources to be allocated for tens, hundreds, or thousands of operators to manually determine real time estimated times of arrival for scheduled appointments using the features or feature values.

As indicated above, FIG. 2 is provided as an example. Other examples may differ from what is described in connection with FIG. 2.

Figure 3:
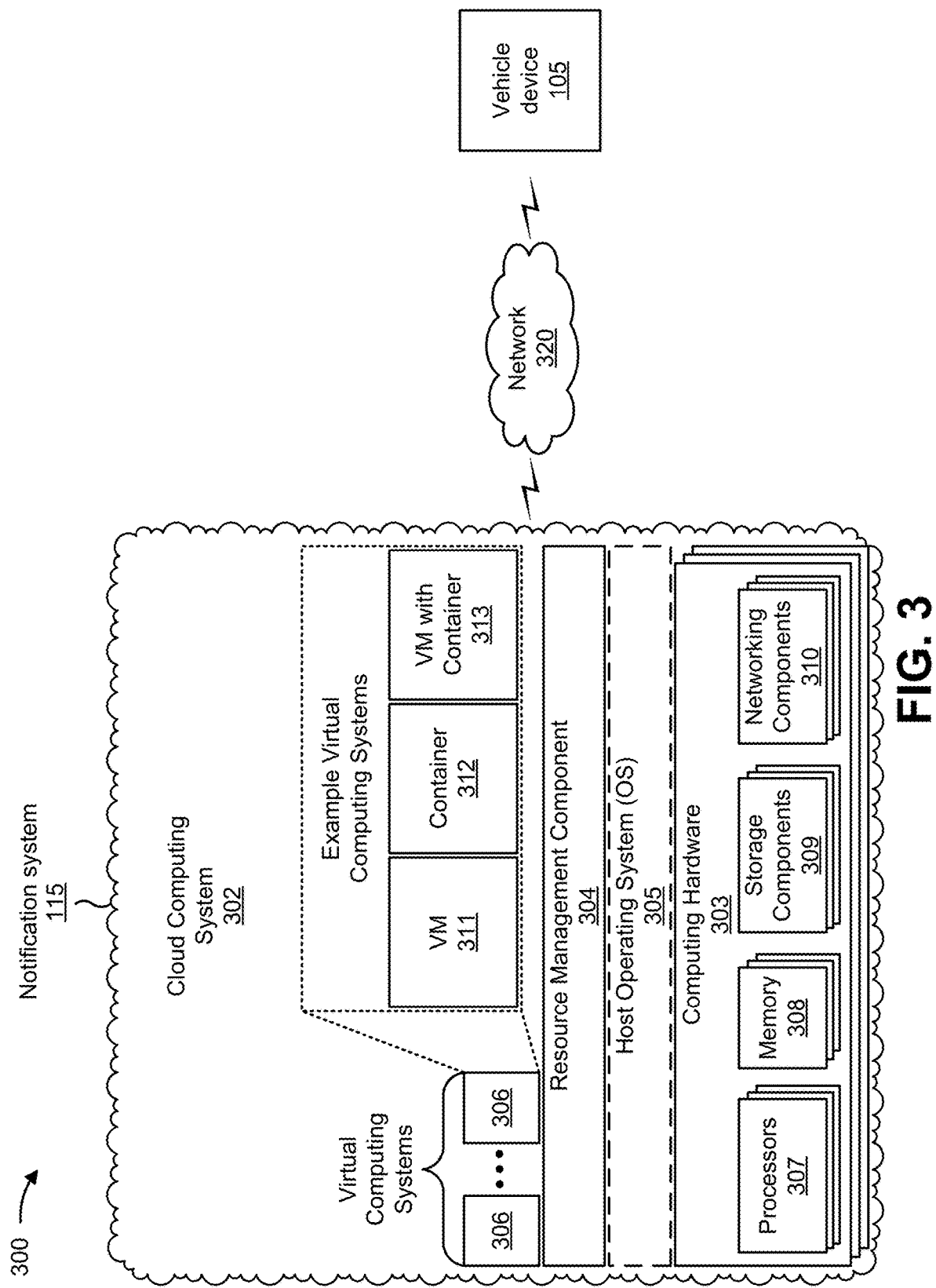
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a notification system 115, which may include one or more elements of and/or may execute within a cloud computing system 302. The cloud computing system 302 may include one or more elements 303-313, as described in more detail below. As further shown in FIG. 3, environment 300 may include a network 320 and/or vehicle device 105. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the notification system 115 may include one or more elements 303-313 of the cloud computing system 302, may execute within the cloud computing system 302, and/or may be hosted within the cloud computing system 302, in some implementations, the notification system 115 may not be cloud-based (e.g., may be implemented outside of a cloud computing system) or may be partially cloud-based. For example, the notification system 115 may include one or more devices that are not part of the cloud computing system 302, such as device 300 of FIG. 3, which may include a standalone server or another type of computing device. The notification system 115 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Vehicle device 105 includes one or more devices capable of receiving, generating, storing, processing, and/or providing information, such as information described herein. For example, vehicle device 105 may include a device included in a vehicle (e.g., vehicle 110) for obtaining location data associated with vehicle 110 traveling along a route. For example, vehicle device 105 may include a GPS device, a Galileo system, a vehicle tracking unit, and/or the like. In some implementations, vehicle device 105 may include a device for obtaining other types of data associated with vehicle 110 traveling along a route. For example, vehicle device 105 may include an inertial measurement unit, a three-axis accelerometer, a gyroscope, an on-board diagnostics (OBD) device, an engine control unit (ECU), and/or the like.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
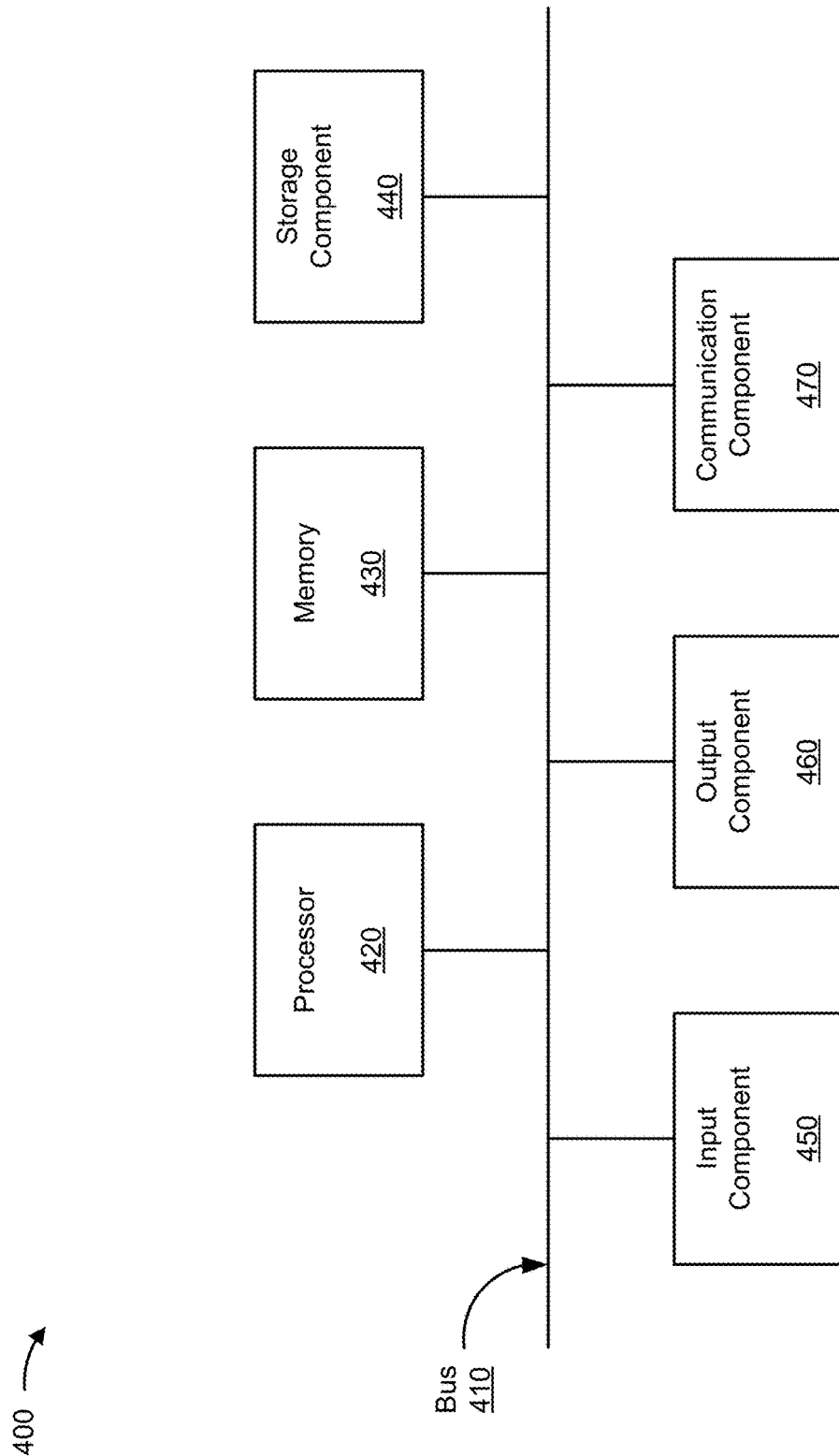
FIG. 4 is a diagram of example components of one or more devices of FIG. 3.

FIG. 4 is a diagram of example components of a device 400, which may correspond to vehicle device 105, notification system 115, and/or computing hardware 303. In some implementations, vehicle device 105, notification system 115, and/or computing hardware 303 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing models to determine real time estimated times of arrival for scheduled appointments. In some implementations, one or more process blocks of FIG. 5 may be performed by a device (e.g., notification system 115). In some implementations, one or more process blocks of FIG. 5 may be performed by another device or a group of devices separate from or including the device, such as vehicle device 105. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving schedule data identifying schedules of appointments for drivers of vehicles and location data identifying geographical locations of the vehicles associated with the respective schedules (block 510). For example, the device may receive schedule data identifying schedules of appointments for drivers of vehicles and location data identifying geographical locations of the vehicles associated with the respective schedules, as described above.

As further shown in FIG. 5, process 500 may include receiving traffic data identifying traffic conditions associated with the geographical locations of the vehicles (block 520). For example, the device may receive traffic data identifying traffic conditions associated with the geographical locations of the vehicles, as described above.

As further shown in FIG. 5, process 500 may include determining, with a status estimate model, status data identifying estimated statuses of the appointments (block 530). For example, the device may determine, with a status estimate model, status data identifying estimated statuses of the appointments based on the schedule data, the location data, and the traffic data, as described above. In some implementations, determining the status data identifying the estimated statuses of the appointments includes defining a geofence around one of the destinations of one of the appointments; determining a location of a stop by one of the vehicles based on the location data; determining whether the location of the stop is within the geofence, setting a status of the one of the appointments to started when the location of the stop is within the geofence; determining whether a movement of the one of the vehicles exits the geofence after the stop; and setting a status of the one of the appointments to completed when the movement of the one of the vehicles exits the geofence after the stop.

As further shown in FIG. 5, process 500 may include generating, with an isochrone model, sets of isochrones for destinations of the appointments (block 540). For example, the device may generate, with an isochrone model, sets of isochrones for destinations of the appointments based on the schedule data, the location data, and the traffic data, as described above. Each set of the sets of isochrones may include isochrones centered on a corresponding one of the destinations and associated with different travel times to the corresponding one of the destinations.

In some implementations, processing the schedule data, the location data, and the traffic data, with the isochrone model, to generate the sets of isochrones for the destinations of the appointments includes various techniques. For example, the processing may utilize a Dijkstra model to generate graphs with a plurality of nodes that are reachable within a predetermined quantity of time, and generating the sets of isochrones for the destinations based on the graphs with the plurality of nodes. The device may process the sets of isochrones, with a lossy compression model, to compress a storage size of the sets of isochrones and to generate compressed sets of isochrones. The device may store the compressed sets of isochrones in a data structure associated with the device.

As further shown in FIG. 5, process 500 may include calculating, based on the sets of isochrones and the location data, estimated travel time data identifying estimated travel times for the appointments (block 550). For example, the device may calculate, based on the sets of isochrones and the location data, estimated travel time data identifying estimated travel times for the appointments, as described above.

In some implementations, the device may identify, for one of the destinations associated with one of the appointments, a smallest isochrone that includes a current location of one of the vehicles associated with the one of the destinations. The device may identify, for the one of the destinations, a largest isochrone that does not include the current location of the one of the vehicles associated with the one of the destinations. The device may calculate one of the estimated travel times for the one of the appointments based on the smallest isochrone and the largest isochrone.

As further shown in FIG. 5, process 500 may include calculating, with an estimated time of arrival compute model, estimated time of arrival data identifying estimated times of arrival for the appointments (block 560). For example, the device may calculate, with an estimated time of arrival compute model, estimated time of arrival data identifying estimated times of arrival for the appointments based on the status data, the estimated travel time data, and the schedule data, as described above. In some implementations, the device may receive input status data identifying statuses of the appointments that are input to the vehicle devices. The device may update the status data based on the input status data and may calculate updated estimated time of arrival data based on the updated status data.

In some implementations, the device may calculate, for one of the schedules, an estimated time of arrival for a first unserved appointment of the one of the schedules. The device may calculate estimated times of arrival for subsequent appointments of the one of the schedules. For example, the device may determine, for one of the appointments of one of the schedules and based on the status data, whether one of the drivers is working on the one of the appointments or is driving one of the vehicles. The device may determine, when the one of the drivers is working on the one of the appointments, a quantity of time associated with completing the one of the appointments. The device may add the quantity of time to a travel time associated with a next one of the appointments of the one of the schedules to determine an estimated time of arrival for the next one of the appointments. Alternatively, and/or additionally, the device may determine, for one of the appointments of one of the schedules and based on the status data, a quantity of time associated with completing the one of the appointments and may add the quantity of time to a travel time associated with a next one of the appointments of the one of the schedules to determine an estimated time of arrival for the next one of the appointments.

As further shown in FIG. 5, process 500 may include performing one or more actions based on the estimated time of arrival data (block 570). For example, the device may perform one or more actions based on the estimated time of arrival data, as described above.

In some implementations, performing the one or more actions includes updating the schedule data, based on the estimated time of arrival data, to generate updated schedule data, and providing the updated schedule data for display. Alternatively, and/or additionally, performing the one or more actions may include providing the estimated time of arrival data to the vehicle devices of the vehicles; reassigning a particular appointment, of the appointments, from a first driver, of the drivers, to a second driver based on the estimated time of arrival data; providing the estimated time of arrival data to devices of customers associated with the appointments; or modifying one or more of the status estimate model, the isochrone model, the estimated time of arrival compute model based on the estimated time of arrival data, updating the schedule data, based on the estimated time of arrival data, to generate updated schedule data, and/or providing the updated schedule data to the vehicle devices of the vehicles.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, schedule data identifying schedules of appointments for drivers of vehicles and location data identifying geographical locations, of the vehicles, associated with the respective schedules;
   receiving, by the device, traffic data identifying traffic conditions associated with the geographical locations of the vehicles;
   determining, by the device and with a status estimate model, status data identifying estimated statuses of the appointments based on the schedule data, the location data, and the traffic data;
   training, by the device and based on historical data, an isochrone model to generate a plurality of polygons representing sets of isochrones for destinations of the appointments,
      wherein the device uses machine learning to train the isochrone model based on the historical data;
   generating, by the device and based on inputting the schedule data, the location data, and the traffic data into the isochrone model, the plurality of polygons,
      wherein each of the plurality of polygons is associated with a respective portion of a map and encompasses points on the map from which a respective destination, of the destinations, of a respective appointment, of the appointments, can be reached via a particular mode of travel;

identifying, based on generating the plurality of polygons, a smallest polygon, of the plurality of polygons, that includes a current location of a particular vehicle of the vehicles;

identifying, based on generating the plurality of polygons, a particular largest polygon, of a particular subset of polygons of the plurality of polygons, that does not include the current location of the particular vehicle, wherein the particular subset of polygons is associated with a particular appointment, of the appointments, for a particular schedule of the schedules;

calculating, by the device, an estimated time of arrival for the particular vehicle at a subsequent appointment, of the appointments, for the schedule, wherein the estimated time of arrival is based on:
the smallest polygon and the particular largest polygon, and
the status data;

comparing, by the device, an actual time of arrival that the particular vehicle arrived at the subsequent appointment to the estimated time of arrival for the particular vehicle at the subsequent appointment;

determining, by the device and based on comparing the actual time of arrival to the estimated time of arrival, an accuracy associated with calculating the estimated time of arrival; and modifying, by the device, the isochrone model based on the accuracy,
wherein the device uses the machine learning to modify the isochrone model based on the accuracy.

2. The method of claim 1, further comprising:
updating the schedule data based on the estimated time of arrival; and
providing the updated schedule data.

3. The method of claim 1, further comprising one or more of:
providing estimated time of arrival data indicating the estimated time of arrival to vehicle devices of the vehicles;
reassigning a particular appointment, of the appointments, from a first driver, of the drivers, to a second driver, of the drivers, based on the estimated time of arrival; or
providing the estimated time of arrival data to devices of customers associated with the appointments.

4. The method of claim 1, further comprising:
updating the schedule data based on the estimated time of arrival; and
providing the updated schedule data to vehicle devices of the vehicles.

5. The method of claim 1, further comprising:
receiving input status data identifying statuses of the appointments; and
updating the status data based on the input status data.

6. The method of claim 1, wherein determining the status data identifying the estimated statuses of the appointments comprises:
defining a geofence around one of the destinations of one of the appointments;
determining a location of a stop by one of the vehicles based on the location data;
determining whether the location of the stop is within the geofence;
setting a status of the one of the appointments to started when the location of the stop is within the geofence; and
determining whether a movement of the one of the vehicles exits the geofence after the stop; and setting a status of the one of the appointments to completed when the movement of the one of the vehicles exits the geofence after the stop.

7. The method of claim 1, wherein a center of each of the plurality of polygons represents the respective destination.

8. A device, comprising:
one or more processors configured to:
receive schedule data identifying schedules of appointments for drivers of vehicles;
receive, from vehicle devices of the vehicles, location data identifying geographical locations, of the vehicles, associated with the schedules;
receive traffic data identifying traffic conditions associated with the geographical locations of the vehicles;
determine, based on the schedule data, the location data, and the traffic data, status data identifying estimated statuses of the appointments;
train, based on historical data, an isochrone model to generate a plurality of polygons representing sets of isochrones for destinations of the appointments,
wherein the device uses machine learning to train the isochrone model based on the historical data;
generate, with the isochrone model and based on inputting the schedule data, the location data, and the traffic data into the isochrone model, the plurality of polygons,
wherein each of the plurality of polygons is associated with a respective portion of a map and encompasses points on the map from which a respective destination, of the destinations, of a respective appointment, of the appointments, can be reached via a particular mode of travel;
identify, based on generating the plurality of polygons, a smallest polygon, of the plurality of polygons, that includes a current location of a particular vehicle of the vehicles;
identify, based on generating the plurality of polygons, a particular largest polygon, of a particular subset of polygons of the plurality of polygons, that does not include the current location of the particular vehicle, wherein the particular subset of polygons is associated with a particular appointment of the appointments, for a particular schedule of the schedules;
calculate an estimated time of arrival for the particular vehicle at a subsequent appointment, of the appointments, for the schedule, wherein the estimated time of arrival is based on:
the smallest polygon and the particular largest polygon, and
the status data;
compare an actual time of arrival that the particular vehicle arrived at the subsequent appointment to the estimated time of arrival for the particular vehicle at the subsequent appointment;
determine, based on comparing the actual time of arrival to the estimated time of arrival, an accuracy associated with calculating the estimated time of arrival; and
modify, using the machine learning, the isochrone model based on the accuracy.

9. The device of claim 8, wherein each of the plurality of polygons are centered on a corresponding one of the destinations and associated with different travel times to the corresponding one of the destinations.

10. The device of claim 8, wherein the one or more processors are further configured to:

generate a compressed plurality of polygons based on processing the plurality of polygons with a lossy compression model; and store the compressed plurality of polygons in a data structure associated with the device.

11. The device of claim 8, wherein the one or more processors, when identifying the particular largest polygon, are configured to:

identify, based on generating the plurality of polygons, particular largest polygons, of particular subsets of polygons of the plurality of polygons, that do not include the current location of the particular vehicle, wherein the particular subsets of polygons are associated with the appointments; and wherein the one or more processors, when calculating the estimated time of arrival, are configured to:

calculate, based on the smallest polygon and the particular largest polygons, estimated times of arrivals, including the estimated time of arrival, for subsequent appointments, including the subsequent appointment, of the schedule.

12. The device of claim 8, wherein the one or more processors are further configured to:

determine, for the particular appointment and based on the status data, whether one of the drivers is working on the one of the appointments;

determine, when the one of the drivers is working on the particular appointment, a quantity of time associated with completing the particular appointment; and add the quantity of time to a travel time associated with the subsequent appointment of the one of the schedules to calculate the estimated time of arrival for the subsequent appointment.

13. The device of claim 8, wherein the one or more processors are further configured to:

determine, for the particular appointment and based on the status data, a quantity of time associated with completing the particular appointment; and add the quantity of time to a travel time associated with the subsequent appointment to calculate the estimated time of arrival for the subsequent appointment.

14. The device of claim 8, wherein the one or more processors are further configured to perform one or more of:

provide estimated time of arrival data indicating the estimated time of arrival to vehicle devices of the vehicles;

reassign a particular appointment, of the appointments, from a first driver, of the drivers, to a second driver, of the drivers, based on the estimated time of arrival data; or provide the estimated time of arrival data to devices of customers associated with the appointments.

15. The device of claim 8, wherein the one or more processors, that cause the device to determine the status data identifying the estimated statuses of the appointments, are configured to:

define a geofence around one of the destinations of one of the appointments;

determine a location of a stop by one of the vehicles based on the location data;

determine whether the location of the stop is within the geofence;

set a status of the one of the appointments to started when the location of the stop is within the geofence;

determine whether a movement of the one of the vehicles exits the geofence after the stop; and set a status of the one of the appointments to completed when the movement of the one of the vehicles exits the geofence after the stop.

16. A non-transitory computer-readable medium storing a set of instructions, the set of instructions comprising:

one or more instructions that, when executed by one or more processors of a device, cause the device to:

receive schedule data identifying schedules of appointments for drivers of vehicles;

receive, from vehicle devices of the vehicles, location data identifying geographical locations of the vehicles associated with the schedules;

receive traffic data identifying traffic conditions associated with the geographical locations of the vehicles;

determine, based on the schedule data, the location data, and the traffic data, status data identifying estimated statuses of the appointments;

train, based on historical data, an isochrone model to generate a plurality of polygons representing sets of isochrones for destinations of the appointments, wherein the device uses machine learning to train the isochrone model based on the historical data;

generate, with the isochrone model and based on inputting the schedule data, the location data, and the traffic data into isochrone model, the plurality of polygons, wherein each of the plurality of polygons is associated with a respective portion of a map and encompasses points on the map from which a respective destination, of the destinations, of a respective appointment, of the appointments, can be reached via a particular mode of travel;

identify, based on generating the plurality of polygons, a smallest polygon, of the plurality of polygons, that includes a current location of a particular vehicle of the vehicles;

identify, based on generating the plurality of polygons, a particular largest polygon, of a particular subset of polygons of the plurality of polygons, that does not include the current location of the particular vehicle, wherein the particular subset of polygons is associated with a particular appointment, of the appointments, for a particular schedule of the schedules;

calculate an estimated time of arrival for the particular vehicle at a subsequent appointment, of the appointments, for the schedule, wherein the estimated time of arrival is based on:

the smallest polygon and the particular largest polygon, and the status data;

compare an actual time of arrival that the particular vehicle arrived at the subsequent appointment to the estimated time of arrival for the particular vehicle at the subsequent appointment;

determine, based on comparing the actual time of arrival to the estimated time of arrival, an accuracy associated with calculating the estimated time of arrival; and modify, using the machine learning, the isochrone model based on the accuracy.

17. The non-transitory computer-readable medium of claim 16, wherein the one or more instructions further cause the device to one or more of:

update the schedule data based on the estimated time of arrival;

provide estimated time of arrival data indicating the estimated time of arrival to the vehicle devices of the vehicles;

reassign a particular appointment, of the appointments, from a first driver, of the drivers, to a second driver, of the drivers, based on the estimated time of arrival;

provide the estimated time of arrival data to devices of customers associated with the appointments;

modify the isochrone model based on the estimated time of arrival data; or provide the updated schedule data to the vehicle devices of the vehicles.

18. The non-transitory computer-readable medium of claim 16, wherein the one or more instructions further cause the device to:

receive input status data identifying statuses of the appointments; and update the status data based on the input status data.

19. The non-transitory computer-readable medium of claim 16, wherein the one or more instructions, that cause the device to determine the status data identifying the estimated statuses of the appointments, cause the device to:

define a geofence around one of the destinations of one of the appointments;

determine a location of a stop by one of the vehicles based on the location data;

determine whether the location of the stop is within the geofence;

set a status of the one of the appointments to started when the location of the stop is within the geofence;

determine whether a movement of the one of the vehicles exits the geofence after the stop; and set a status of the one of the appointments to completed when the movement of the one of the vehicles exits the geofence after the stop.

20. The non-transitory computer-readable medium of claim 16, wherein a center of each of the plurality of polygons represents the respective destination.

* * * * *